United States Patent
Mashima et al.

(10) Patent No.: US 12,116,250 B2
(45) Date of Patent: Oct. 15, 2024

(54) OUTRIGGER CONTROL DEVICE

(71) Applicant: TADANO LTD., Kagawa (JP)

(72) Inventors: Keita Mashima, Kagawa (JP); Shinsuke Kanda, Kagawa (JP)

(73) Assignee: TADANO LTD., Kagawa (JP)

( * ) Notice: Subject to any disclaimer, the term of this patent is extended or adjusted under 35 U.S.C. 154(b) by 453 days.

(21) Appl. No.: 17/422,649

(22) PCT Filed: Feb. 14, 2020

(86) PCT No.: PCT/JP2020/005896
§ 371 (c)(1),
(2) Date: Jul. 13, 2021

(87) PCT Pub. No.: WO2020/166720
PCT Pub. Date: Aug. 20, 2020

(65) Prior Publication Data
US 2022/0073323 A1    Mar. 10, 2022

(30) Foreign Application Priority Data

Feb. 14, 2019   (JP) ................................ 2019-024145

(51) Int. Cl.
*B66C 23/80*    (2006.01)
*B60S 9/12*    (2006.01)

(52) U.S. Cl.
CPC ................ *B66C 23/80* (2013.01); *B60S 9/12* (2013.01)

(58) Field of Classification Search
CPC ......... B66C 23/80; B66C 23/78; B66C 13/18; B66C 13/20; B60S 9/12; B60S 9/00; B60S 9/10; B60S 9/02
See application file for complete search history.

(56) References Cited

U.S. PATENT DOCUMENTS 4,142,710 A * 3/1979 Okuda ................... B66C 23/80
254/423
5,580,095 A * 12/1996 Fukumoto ............... B66C 23/80
280/DIG. 1
(Continued)

FOREIGN PATENT DOCUMENTS

| CN | 101963489 A | 2/2011 |
| JP | H09-175797 A | 7/1997 |

(Continued)

OTHER PUBLICATIONS

May 12, 2020, International Search Report issued for related PCT application No. PCT/JP2020/005896.

(Continued)

*Primary Examiner* — James M Dolak
(74) *Attorney, Agent, or Firm* — Paratus Law Group, PLLC (57) ABSTRACT

An outrigger control device (A1) includes: a plurality of outriggers (30) that is provided in a traveling body (10) and extendable/contractible between a non-grounding state where the traveling body is not supported and a grounding state where the traveling body is supported; an inclination sensor (310) that is provided in the traveling body and can detect inclination of the traveling body; and a controller (100) that controls an extension/contraction action of each outrigger and acquires a detection signal of the inclination sensor (310). Further, the controller is provided with a grounding determination processing unit (101) that controls the outriggers to perform a predetermined grounding determination action and determines whether or not each outrigger is in the grounding state on the basis of the detected value of the inclination sensor at the time.

4 Claims, 5 Drawing Sheets

(56) References Cited

U.S. PATENT DOCUMENTS

| | | | | |
|---|---|---|---|---|
| 6,202,013 | B1* | 3/2001 | Anderson | E04G 21/0436 |
| | | | | 701/50 |
| 6,351,696 | B1* | 2/2002 | Krasny | B66C 23/80 |
| | | | | 701/50 |
| 7,012,540 | B2* | 3/2006 | Petzold | B66C 23/90 |
| | | | | 340/685 |
| 9,199,828 | B2* | 12/2015 | Steinich | B66C 23/78 |
| 9,284,167 | B2* | 3/2016 | Stacy, II | E21B 7/024 |
| 10,124,773 | B1* | 11/2018 | Mourlam | B60S 9/12 |
| 10,435,283 | B1* | 10/2019 | Mourlam | B66F 17/006 |
| 10,752,479 | B2* | 8/2020 | Iotti | B66C 23/80 |
| 10,988,355 | B2* | 4/2021 | Tokutome | B66C 23/94 |
| 11,767,206 | B2* | 9/2023 | Iotti | B66F 9/07559 |
| | | | | 280/766.1 |
| 11,850,456 | B2* | 12/2023 | Betz | A62C 27/00 |
| 12,024,906 | B2* | 7/2024 | Müller | E04G 21/0445 |

FOREIGN PATENT DOCUMENTS

| | | |
|---|---|---|
| JP | H10-230824 A | 9/1998 |
| JP | 2016-078617 A | 5/2016 |

OTHER PUBLICATIONS

May 12, 2020, International Search Opinion issued for related PCT application No. PCT/JP2020/005896.

* cited by examiner

OUTRIGGER CONTROL DEVICE

CROSS REFERENCE TO PRIOR APPLICATION

This application is a National Stage Patent Application of PCT International Patent Application No. PCT/JP2020/005896 (filed on Feb. 14, 2020) under 35 U.S.C. § 371, which claims priority to Japanese Patent Application No. 2019-024145 (filed on Feb. 14, 2019), which are all hereby incorporated by reference in their entirety.

TECHNICAL FIELD

The present disclosure relates to an outrigger control device.

BACKGROUND ART

In the related art, in a work vehicle such as a crane, a high-place work vehicle, or a ladder vehicle that performs a work by extending an in-vehicle boom or ladder, a posture of a vehicle body is stabilized by grounding an outrigger at the time of the work. The vehicle body is supported by contracting the outrigger to be in a non-grounding state at the time of traveling and by extending the outrigger to be in a grounding state at a work site.

When the vehicle body posture is stabilized by using the outrigger in this manner, all of a plurality of outriggers need to be grounded. Thus, there is known a configuration in which a ground sensor for detecting that the outrigger is grounded is provided to detect whether or not the outrigger is grounded (see, for example, Patent Literature 1). In the ground sensor of the related art, a sensor such as a limit switch, a potentiometer, or a load cell is provided in the outrigger, and whether or not the outrigger is grounded is detected on the basis of an extension/contraction amount of the outrigger, a ground reaction, and the like. In addition, the ground sensor provided in each outrigger is connected to an in-vehicle controller via a wiring.

CITATION LIST

Patent Literature

Patent Literature 1: Japanese Patent Application Laid-Open No. H09-175797

SUMMARY OF THE INVENTION

Problems to be Solved by the Invention

As described above, the ground sensor is provided in each outrigger, and a detection signal is sent to the controller via the wiring. Thus, as many ground sensors as the number of outriggers are required, and wirings connecting the ground sensors and the controller are required. Accordingly, since cost is required by the number of sensors and the number of wirings and the wirings are laid across a traveling body and a movable part, there is a disconnection concern and the like as compared with a case where a wiring is provided in a non-drive unit, and thus, there is a concern that reliability is reduced.

The present disclosure has been made in view of the above problems, and an object thereof is to provide an outrigger control device advantageous in terms of cost and reliability.

Solutions to Problems

An outrigger control device of the present disclosure includes a plurality of outriggers that is provided in a traveling body, and is extendable/contractible between a non-grounding state where the traveling body is not supported and a grounding state where the traveling body is supported, an inclination sensor that is provided in the traveling body, and is able to detect an inclination of the traveling body, and a controller that controls an extension/contraction action of the outrigger and acquires a detection signal of the inclination sensor. The controller includes a grounding determination processing unit that controls the outrigger to perform a predetermined grounding determination action and determines whether or not the outrigger is in the grounding state on the basis of a detected value of the inclination sensor at the time of the grounding determination action.

Effects of the Invention

In the outrigger control device of the present disclosure, it is determined whether the outrigger is in the grounding state or the non-grounding state on the basis of the grounding determination action of the outrigger and the detected value of the inclination sensor provided in the traveling body. Thus, it is not necessary to provide the ground sensor in each outrigger, and the wiring for connecting each ground sensor and the controller is not necessary. Accordingly, the number of ground sensors and the number of wirings are reduced, and thus, cost can be reduced. There is no disconnection concern, and thus, reliability can be improved.

DESCRIPTION OF EMBODIMENTS

Hereinafter, a best mode for realizing the outrigger control device of the present disclosure will be described with reference to the drawings.

First Embodiment

Hereinafter, an outrigger control device A1 of a first embodiment will be described. The outrigger control device A1 is mounted on a crane CC illustrated in FIGS. 1 and 2. Thus, first, the crane CC will be described.

Figure 1:
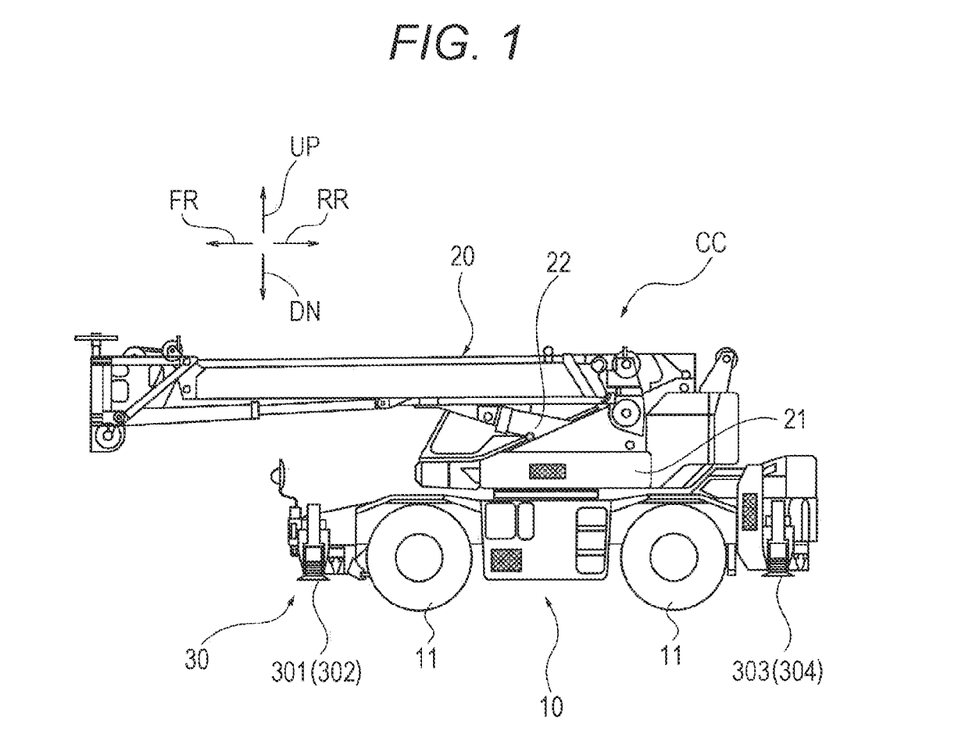
FIG. 1 is a side view of a crane CC on which an outrigger control device according to a first embodiment is mounted.
Figure 2:
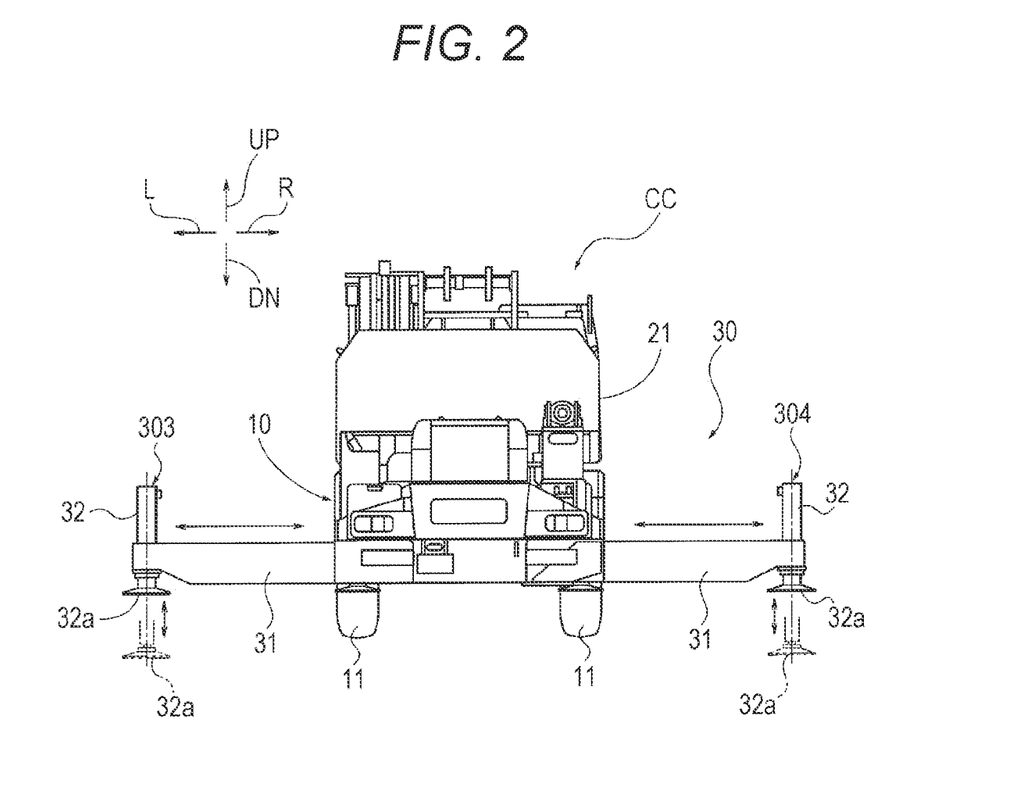
FIG. 2 is a rear view of the crane CC.

The crane CC includes a traveling body 10, a boom 20, and an outrigger 30. The traveling body 10 is a vehicle body of a vehicle that can be self-propelled by wheels 11.

The boom 20 is provided to be able to rise and fall and to be extendable/contractible on a slewing platform 21 provided in the traveling body 10 so as to be able to be slewed by 360 degrees in a horizontal direction. Note that the rising and falling of the boom 20 are executed by extension/contraction of a derricking cylinder 22 provided between the boom 20 and the slewing platform 21. In addition, the extension/contraction of the boom 20 is executed by extension/contraction of a telescopic cylinder 23 (see FIG. 3) provided inside the boom.

Note that, in FIG. 1, the boom 20 is in a laid state where a length is shortened to a minimum length, and represents a housed posture in which a distal end thereof is directed forward of the traveling body 10 (a posture when the traveling body 10 travels). In addition, a work can be performed by slewing the slewing platform 21, extending the boom 20 from the housed posture, or standing the boom.

The outrigger 30 is a so-called H-shaped outrigger, and includes first to fourth outriggers 301, 302, 303, and 304. That is, the traveling body 10 includes a pair of left and right first outrigger 301 and second outrigger 302 provided on a front side, and a pair of left and right third outrigger 303 and fourth outrigger 304 provided on a rear side.

Note that, in the description of the present specification, front, rear, left, right, up, and lower directions are based on a direction by the crane CC. In the drawings, a direction of an arrow FR is defined as the front, a direction of an arrow RR is defined as the rear, a direction of an arrow L is defined as the left, a direction of an arrow R is defined as the right, a direction of an arrow UP is defined as the upper, and a direction of an arrow DN is defined as the lower. In addition, since the outriggers 301 to 304 having the same configuration are provided symmetrically, in the following description, the reference signs 301 to 304 are used only when a specific outrigger among the four outriggers is indicated, and the outrigger 30 is simply used when the specific outrigger is not indicated.

The outrigger 30 is provided in the traveling body 10, and includes, as illustrated in FIG. 2, beams 31 extendable/contractible in a left-right direction, and jacks 32 provided at distal end portions of the beams 31 and extendable/contractible in an upper-lower direction. In addition, substantially disk-shaped floats 32a are provided at lower end portions of the jacks 32, and the floats 32a are grounded when the outrigger 30 is grounded. Then, the traveling body 10 can be moved up or down by causing the floats 32a to be grounded and vertically extending/contracting the jacks 32.

In addition, the beams 31 and the jacks 32 have hydraulic cylinders 331, 332, 333, and 334 (see FIG. 3) connected to a hydraulic source (for example, a hydraulic pump and an oil tank) not illustrated.

These hydraulic cylinders 331 to 334 extend/contract by supplying and discharging hydraulic pressures on the basis of an operation of an outrigger hydraulic pressure control unit 110 (see FIG. 3) controlled by a controller 100. Accordingly, the beam 31 of each of the outriggers 301 to 304 extends/contracts in the left-right direction, and the jack 32 extends/contracts in the upper-lower direction. Note that the outrigger hydraulic pressure control unit 110 includes switching valves that are controlled by the controller 100 and supply and discharge hydraulic pressures to and from the hydraulic cylinders 331, 332, 333, and 334, respectively.

Figure 3:
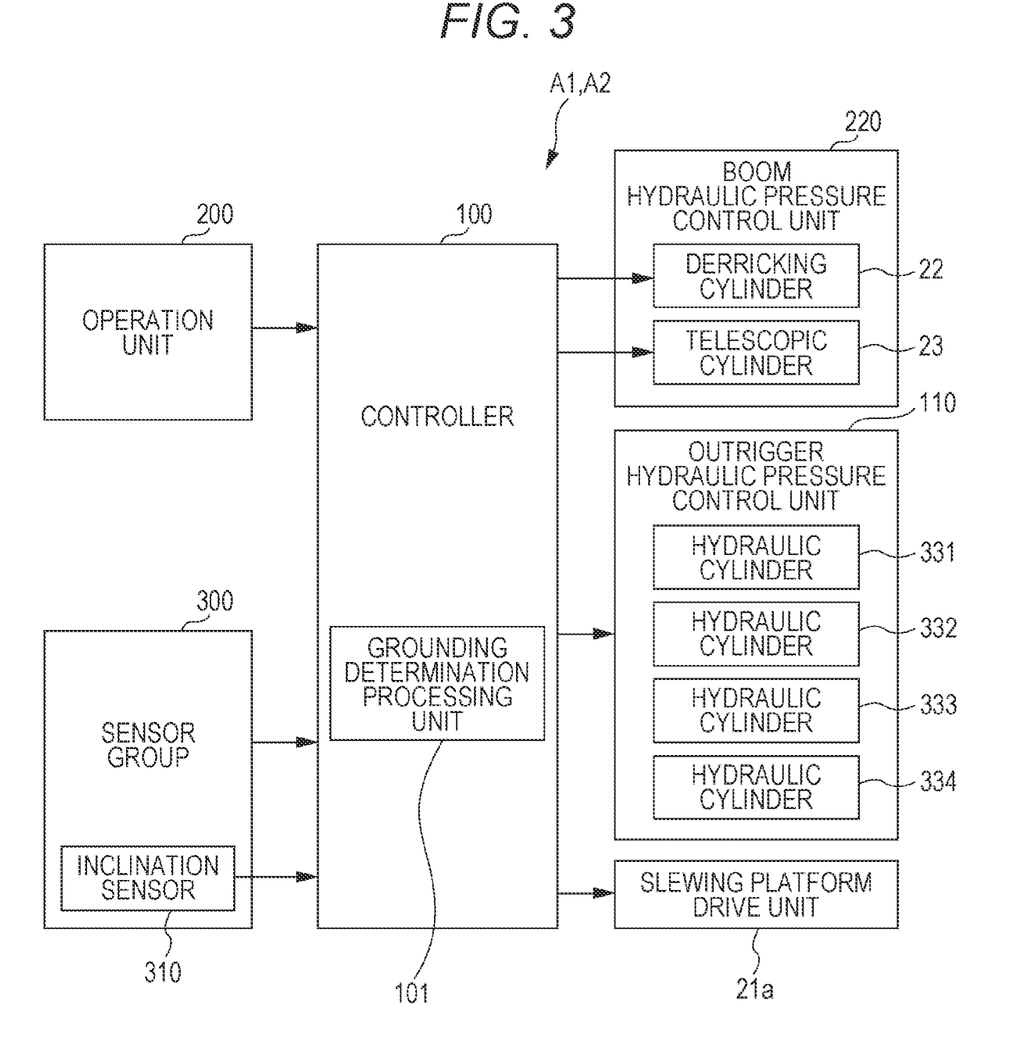
FIG. 3 is a block diagram illustrating a configuration of a control system of the outrigger control device according to the first embodiment.

Note that the controller 100 controls a slewing platform drive unit 21a that drives the slewing platform 21 to slew, and a boom hydraulic pressure control unit 220 that extends/contracts the derricking cylinder 22 and the telescopic cylinder 23 of the boom 20. In addition, the controller 100 is connected to an operation unit 200 for causing the boom 20 and the outrigger 30 to act, and a sensor group 300 for detecting action states of the boom 20 and the outrigger 30.

The sensor group 300 includes a sensor that detects the posture of the boom 20 and a slewing angle of the slewing platform 21 and an inclination sensor 310 that detects an inclination angle of the traveling body 10 in addition to a sensor that detects the hydraulic pressure supplied to each of the cylinders 22, 23, and 331 to 334 described above.

The inclination sensor 310 is a so-called biaxial inclinometer that detects the inclination of the traveling body 10 in a front-rear direction and the left-right direction. An existing sensor for detecting the inclination of the traveling body 10 can be applied as the inclination sensor 310 when the posture of the traveling body 10 is controlled such that the traveling body takes an optimum posture (basically, horizontal) during the work of the boom 20 of the crane CC.

Further, the controller 100 includes a grounding determination processing unit 101 that executes grounding determination processing of determining whether or not each of the outriggers 301 to 304 is grounded when the outrigger 30 acts to change from a non-grounding state to a grounding state.

Hereinafter, a flow of the grounding determination processing executed by the grounding determination processing unit 101 will be described. In the first embodiment, the grounding determination processing is executed together with a grounding action of the outrigger 30, and a flow of the processing will be described with reference to a flowchart of FIG. 4.

Figure 4:
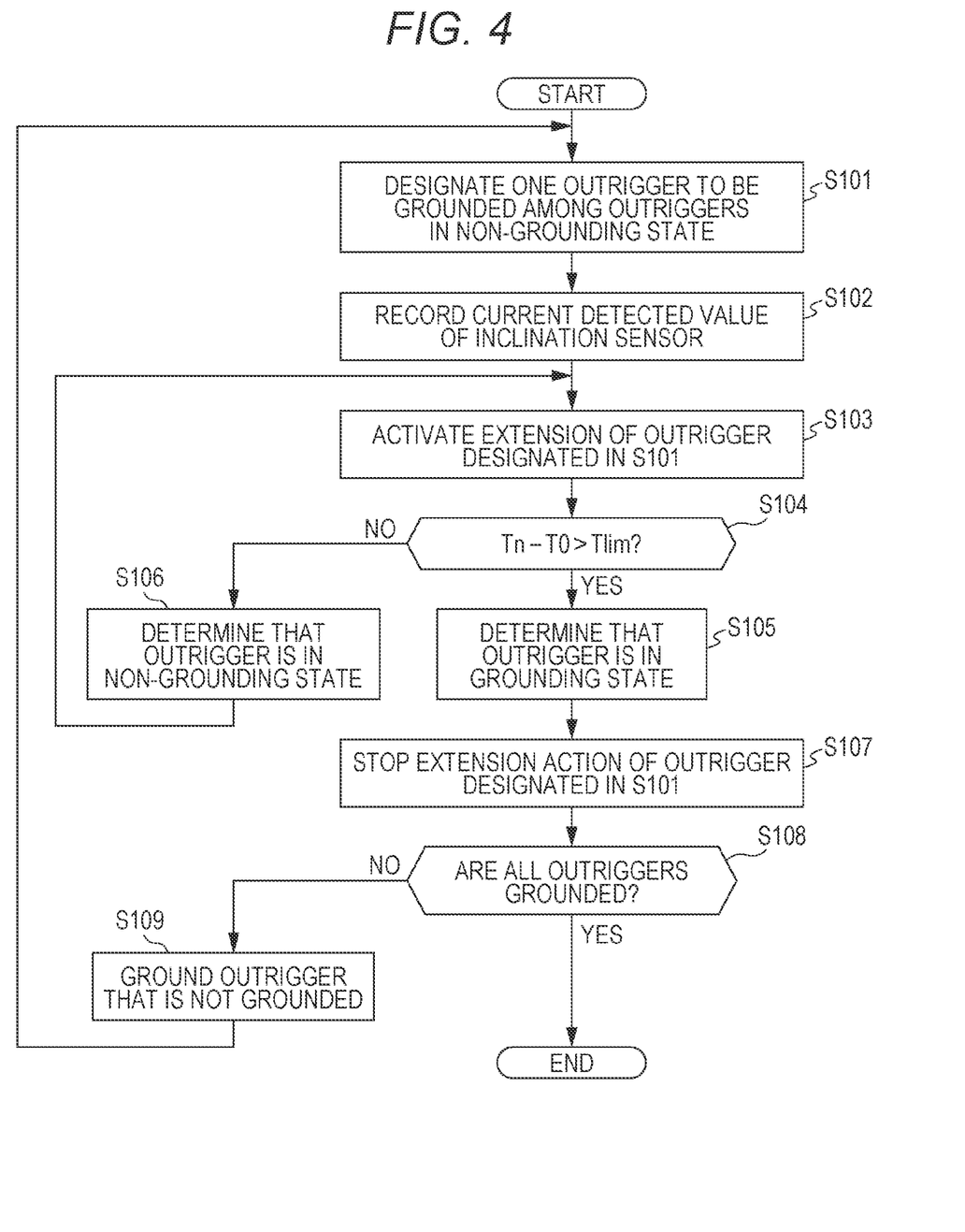
FIG. 4 is a flowchart illustrating a flow of grounding determination processing of the outrigger control device according to the first embodiment.

First, in first step S101, the controller 100 designates one of the outriggers 30 in the non-grounding state. Although this designation may be performed on the basis of a manual operation by an operator, in the first embodiment, the controller 100 automatically designates the first outrigger 301 to the fourth outrigger 304 as the outriggers 30 to be sequentially grounded. Accordingly, in a state where all the outriggers 301 to 304 are not grounded, first, the controller 100 designates the first outrigger 301.

In next step S102, the controller 100 records, as an initial value T0, a detected value (inclination state) of the inclination sensor 310 at this time. Then, in subsequent step S103, the controller 100 continuously extends the jack 32 of the outrigger 30 (first, the first outrigger 301) designated in step S101. Note that, in the first embodiment, the beam 31 is extended to a side of the traveling body 10 by a predetermined amount before an extension action of the jack 32 is performed. An extension action of the beam 31 may be performed on the beams 31 of all the outriggers 30 in advance at the start of the execution of the grounding determination processing, or may be performed on the beam 31 of the outrigger 30 to be grounded when the processing of step S103 is performed.

In next step S104, the controller 100 acquires a detection signal from the inclination sensor 310, and determines whether or not a difference between a detected value Tn of the inclination sensor 310 and the initial value T0 recorded in step S102 exceeds a preset threshold Tlim. When the difference between the detected value Tn and the initial value T0 exceeds the threshold Tlim, the processing proceeds to step S105, and the controller 100 determines that the outrigger is in the grounding state. On the other hand, when the difference between the detected value Tn and the initial value T0 does not exceed the threshold Tlim in step S104, the processing proceeds to step S106, and the controller 100 determines that the outrigger is in the non-grounding state. The processing returns to step S103, and the extension action of the outrigger 30 is continued.

Note that the threshold Tlim is set in advance on the basis of an inclination amount of the traveling body 10 generated when the outrigger 30 is grounded. That is, when the outrigger 30 in the non-grounding state is extended and grounded and continues to be extended in this state, one portion of the traveling body 10 is displaced upward, and the inclination state of the traveling body 10 changes. Accordingly, a change in the inclination amount generated when the designated one outrigger 30 is extended and grounded and is further extended by a necessary amount in order for the outrigger 30 to support the traveling body 10 is obtained by an experiment or a simulation. Then, an optimum threshold Tlim is set in order to determine that the outrigger 30 is grounded and extended by a necessary amount on the basis of the obtained change in the inclination amount.

When it is determined that the outrigger is in the grounding state in step S105, in step S107, the controller 100 stops the extension action of the outrigger 30 designated in step S101, and the processing proceeds to step S108.

In step S108, the controller 100 determines whether or not all the first to fourth outriggers 301 to 304 are in the grounding state. When all the outriggers 301 to 304 are not in the grounding state, the processing proceeds to step S109, and the controller 100 controls the outrigger 30 that is not grounded to execute the grounding action. In addition, when all the four outriggers 301 to 304 are in the grounding state, the processing ends.

Then, when the outrigger 30 that is not grounded is caused to execute the grounding action in step S109, the processing returns to step S101, and the controller 100 designates the outrigger 30 to be grounded next from among the outriggers 30 in the non-grounding state. In the first embodiment, as described above, the outrigger 30 to be grounded is designated in the order of the first outrigger 301 to the fourth outrigger 304.

Note that, in step S102, the controller 100 sets the detected value of the inclination sensor 310 before the next outrigger 30 is extended as the initial value T0 every time. For example, when the first outrigger 301 is grounded and extended by a predetermined amount, the traveling body 10 changes from a horizontal state to an inclination state where a left front side is raised. Thus, when the second outrigger 302 is designated and extended, the controller 100 records, as the initial value T0, the detected value of the inclination sensor 310 in a state where the left front side of the traveling body 10 before the second outrigger 302 is extended is raised and inclined. Then, the controller determines whether the next second outrigger 302 is in the grounding state and is further raised by a predetermined amount on the basis of the difference between the initial value T0 and the subsequent detected value Tn of the inclination sensor 310.

The above pieces of processing of steps S101 to S109 are repeated for each of the four outriggers 301 to 304, and thus, all the four outriggers 301 to 304 can be grounded and can be raised by a predetermined amount. Note that the order of the outriggers 30 to be grounded by being designated and extended is not limited to this order, and may be performed in, for example, another order such as a clockwise order or a counterclockwise order when viewed from above.

(Effects of First Embodiment)

(1) The outrigger control device A1 of the first embodiment includes the plurality of outriggers 30 (301 to 304) that is provided in the traveling body 10 and is extendable/contractible between the non-grounding state where the traveling body 10 is not supported and the grounding state where the traveling body 10 is supported, the inclination sensor 310 that is provided in the traveling body 10 and can detect the inclination of the traveling body 10, and the controller 100 that controls the extension/contraction action of the outrigger 30 and acquires the detection signal of the inclination sensor 310. Further, the controller 100 includes the grounding determination processing unit 101 that controls the outrigger 30 to perform a predetermined grounding determination action and determines whether or not each outrigger is in the grounding state on the basis of the detected value of the inclination sensor 310 at the time of the grounding determination action.

Accordingly, in order to determine whether or not the outrigger is in the grounding state by the action of the outrigger 30 and the detection of the inclination sensor 310, it is not necessary to provide the ground sensor in each outrigger 30, and a wiring for connecting each ground sensor and the controller 100 is not necessary. Accordingly, the number of ground sensors and the number of wirings are reduced, and thus, cost can be reduced. There is no disconnection concern, and thus, reliability can be improved.

(2) In the outrigger control device A1 of the first embodiment, the grounding determination processing unit 101 extends the outriggers 30 from the non-grounding state one by one as the grounding determination action, and determines whether or not the outrigger is in the grounding state on the basis of the detected value of the inclination sensor 310 at the time of extension.

Accordingly, since the inclination sensor 310 detects the posture change (inclination) of the traveling body 10 due to the grounding of one extended outrigger 30, for example, it is possible to reliably detect the grounding state of the outrigger 30 and it is possible to obtain high detection accuracy as compared with a case where the plurality of outriggers 30 such as two or more outriggers are simultaneously extended.

(3) In the outrigger control device A1 of the first embodiment, the grounding determination processing unit 101 determines that the outrigger is in the grounding state when the difference between the detected value Tn as the change amount of the detected value of the inclination sensor 310 and the initial value T0 exceeds the preset threshold Tlim.

Accordingly, the posture change by the extended outrigger 30 can be detected with high accuracy regardless of the posture of the traveling body 10 before the outrigger 30 is extended. Accordingly, the grounding state of the outrigger 30 can be detected with high accuracy on the basis of the detected value of the inclination sensor 310.

(4) In the first embodiment, the pair of left and right outriggers 30 are provided in the front and rear parts of the traveling body 10, respectively, and each outrigger 30 includes the jack 32 that extends/contracts in the upper-lower direction and can move the traveling body 10 in the upper-lower direction.

Accordingly, the grounding state of each of the four outriggers 301 to 304 can be detected by the action of each of the outriggers 301 to 304 and one inclination sensor 310. Thus, the number of unnecessary ground sensors and the number of unnecessary wirings are also large, and the effects of the cost and reliability of the above (1) are further enhanced.

Second Embodiment

Next, another embodiment of the outrigger control device will be described. Note that, in the description of a second embodiment, constituent components common to the first embodiment are denoted by the same reference signs as those of the first embodiment and the description thereof is omitted, and only differences from the first embodiment will be described.

The second embodiment is a modification example of the first embodiment, and is different from the first embodiment in the action of the outrigger 30 and the grounding determination processing on the basis of the detected value of the inclination sensor 310.

Hereinafter, a flow of grounding determination processing by an outrigger control device A2 of the second embodiment will be described. In the grounding determination processing in the second embodiment, first, the grounding actions of all the outriggers 301 to 304 are performed, and thereafter, it is determined whether or not each of the outriggers 301 to 304 is in the grounding state.

Here, first, the grounding action of each outrigger 30 will be described. In this grounding action, the beams 31 of the four outriggers 301, 302, 303, and 304 are extended in the left-right direction as illustrated in FIG. 2, and the jacks 32 are further extended until it is estimated that the jacks are in the grounding state.

The extension of the jacks 32 may be performed by the operator manually operating the operation unit 200 or may be performed by automatic control by the controller 100. When the jacks 32 are extended by the manual operation, for example, it is determined whether or not the jacks are grounded on the basis of a bodily sensation caused by the posture change of the traveling body 10 due to a ground reaction. In this case, the extension action of the jacks 32 is stopped at a point in time at which the operator senses the posture change of the traveling body 10 when the jacks 32 are grounded and estimates that the jacks are grounded.

In addition, in the grounding action of the jack 32 by the automatic control, for example, the extension action of the jack 32 is performed for a predetermined time necessary for the beam 31 to be extended and then grounded.

In this manner, after the jack 32 is extended until it is estimated that the jack 32 is grounded, the controller 100 (grounding determination processing unit 101) subsequently determines whether or not the jack 32 is reliably grounded.

Figure 5:
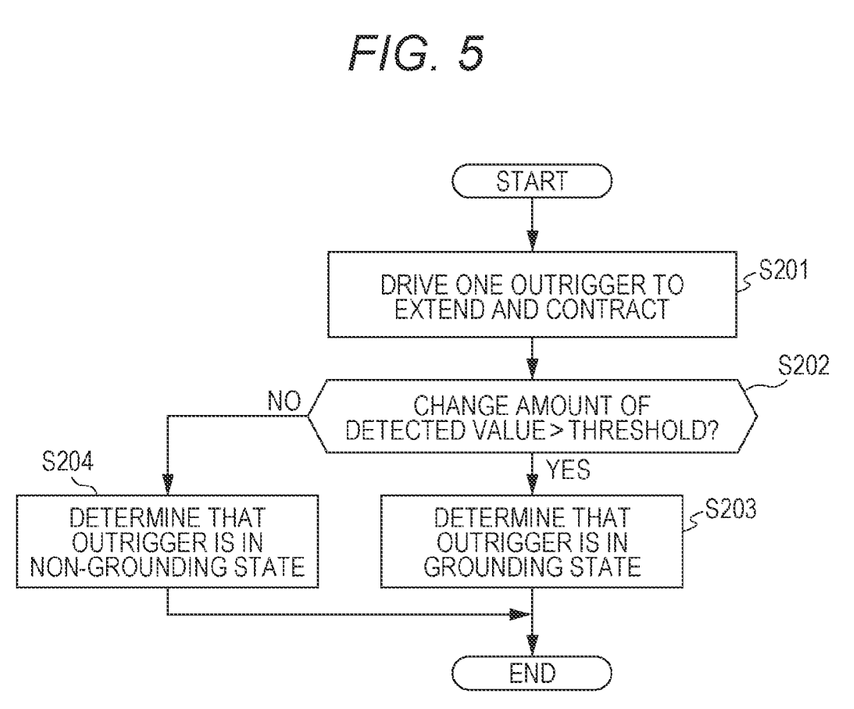
FIG. 5 is a flowchart illustrating a flow of grounding determination processing of an outrigger control device according to a second embodiment.

Hereinafter, the grounding determination processing of the second embodiment by the controller 100 (grounding determination processing unit 101) will be described with reference to a flowchart illustrated in FIG. 5. Note that the grounding determination processing may be started when the operator performs a predetermined start operation by the operation unit 200, or may be automatically started after the extension action when the outrigger 30 is extended by the automatic control as described above.

First, in first step S201, the controller 100 extends/contracts one jack 32 of the four outriggers 301 to 304 as the grounding determination action. In this extension/contraction action, the extension action and the contraction action of the jack 32 are alternately repeated, and are executed a predetermined number of times or for a predetermined time.

In next step S202, the controller 100 acquires the detection signal of the inclination sensor 310 when the extension/contraction action of the jack 32 of the outrigger 30 is performed in step S201, and determines whether or not the change amount of the detected value of the inclination sensor 310 exceeds a preset threshold. Then, when the change amount exceeds the threshold (Yes), the controller 100 determines that the outrigger 30 that has performed the extension/contraction action of the jack 32 in step S201 is in the grounding state (step S203). On the other hand, when the change amount is equal to or less than the threshold (No), the controller 100 determines that the outrigger 30 that has performed the extension/contraction action of the jack 32 in step S201 is in the non-grounding state (step S204).

That is, when the jack 32 of one (for example, the outrigger 301) of the four outriggers 301 to 304 is extended/contracted in a state where the float 32a is grounded, the traveling body 10 moves up and down by a predetermined amount at one point of the four grounded points, and the inclination angle of the traveling body 10 changes. Thus, the change amount of the inclination angle when one jack 32 is extended/contracted by a predetermined amount in a state where the four outriggers 30 are grounded is obtained in advance by an experiment or a simulation, and the threshold is set on the basis of the change amount. Accordingly, in step S202, when the change amount exceeds the threshold, it is possible to determine that the float 32a of the outrigger (for example, the first outrigger 301) is grounded.

On the other hand, when the extended/contracted outrigger 30 is not grounded, the traveling body 10 hardly moves up or down. Thus, when the change amount of the detected value of the inclination sensor 310 does not exceed the threshold, it is possible to determine that the float 32a of the outrigger (for example, the first outrigger 301) is not grounded.

Then, when it is determined that the float 32a is in the non-grounding state, the jack 32 of the corresponding outrigger (for example, the first outrigger 301) is extended, and then the grounding determination processing in steps S201 to S204 is performed again. This action is repeatedly executed until it is determined that the float 32a is grounded.

The grounding determination processing in steps S201 to S204 is sequentially performed for the four outriggers 301 to 304 one by one, and all the four outriggers 301 to 304 are reliably grounded on the basis of the determination result.

Note that, for example, although the traveling body 10 is horizontally controlled by controlling the posture of the traveling body 10 after all the outriggers 30 are grounded, this control itself is not a target of the present disclosure, and thus, the description thereof will be omitted.

As described above, in the outrigger control device A2 of the second embodiment, the grounding determination processing unit 101 extends/contracts the outrigger 30 as the grounding determination action, and determines the grounding state on the basis of the change in the detected value of the inclination sensor 310 when the extension/contraction action is performed.

Accordingly, in the second embodiment, similarly to the above (1), (2), and (4), the number of ground sensors and the number of wirings provided in the four outriggers 30 are reduced, and thus cost can be reduced. There is no disconnection concern, and thus, reliability can be improved. In addition, the grounding state of each of the four outriggers 301 to 304 can be detected by the action of each of the outriggers 301 to 304 and one inclination sensor 310. In addition, the posture change by the extended/contracted outrigger 30, that is, the grounding state can be detected on the basis of the detected value of the inclination sensor 310 regardless of the posture of the traveling body 10 before the outrigger 30 is extended.

Although the embodiments have been described above, the specific configuration of the outrigger control device of the present disclosure is not limited to the above-described embodiments, and changes, additions, and the like in design are allowed without departing from the gist of the present disclosure.

For example, in the embodiments, although the example in which the outrigger control device is applied to the crane CC has been described, the traveling body to which the outrigger control device is applied is not limited to the crane CC, and any traveling body may be used as long as the traveling body includes the plurality of outriggers. Specifically, the present disclosure can also be applied to an industrial machine such as an excavation device in addition to a work vehicle such as a high-place work vehicle and a ladder vehicle other than the crane.

In addition, in the embodiments, although the four outriggers 301 to 304 have been described as the plurality of outriggers 30, the number of outriggers is not limited to four as long as the plurality of outriggers is provided. For example, the present disclosure can also be applied to an example in which a pair of outriggers are provided on the left and right. Further, in the embodiments, although the outrigger 30 including the beam 31 and the jack 32 has been described, the present disclosure is not limited thereto, and any outrigger may be used as long as the outrigger at least extends/contracts and is grounded. In addition, as long as the jack extends/contracts so as to be able to move the traveling body 10 in the upper-lower direction, the present disclosure is not limited to the jack that extends/contracts in a vertical direction like the jack 32 described in the embodiments. For example, the jack may extend/contract in other directions such as the jack that vertically extends/contracts in an oblique direction as described in JP 6258598 B2.

In addition, in the embodiments, although the grounding state at the time of the grounding determination processing has been determined on the basis of the change amount from the initial value T0 and the change amount of the detected value of the inclination sensor 310 when the outrigger 30 is extended/contracted, the present disclosure is not limited thereto. For example, the determination may be performed on the basis of whether or not a change rate of the detected value at the time of extension/contraction of the outrigger 30 exceeds a threshold on the basis of the change rate. That is, when the outrigger 30 is grounded, since a change rate of the inclination angle at the time of the extension action or the extension/contraction action of the outrigger 30 becomes faster than that when the outrigger is not grounded, the grounding state of the outrigger 30 can be determined on the basis of the change rate.

In addition, in the embodiments, although the example in which the extension actions or the extension/contraction actions of the outriggers 30 are performed one by one in the grounding determination processing has been described, the present disclosure is not limited thereto. For example, the grounding determination processing may be performed by causing the plurality of outriggers 30 to simultaneously act. Specifically, as in the embodiments, when the four outriggers 30 are provided and the four outriggers are simultaneously extended or extended/contracted, the traveling body 10 moves up and down at a substantially constant inclination when all the four outriggers are grounded. On the other hand, when there is the outrigger 30 that is not grounded, a displacement amount in the direction of the outrigger 30 that is not grounded in the traveling body 10 is small, and the inclination sensor 310 is inclined in the direction of the outrigger 30 that is not grounded. It may be determined whether the outrigger is in the grounding state or the non-grounding state on the basis of the detection of the inclination state due to such a difference in the displacement amount. Similarly, it may be determined whether the outrigger is in the grounding state or the non-grounding state on the basis of the detection of the inclination state due to the difference in the displacement amount by causing the pair of left and right outriggers 30 to simultaneously act.

Further, in the first embodiment, although the extension action has been performed as the grounding determination action of the outrigger 30, the present disclosure is not limited thereto. For example, after it is determined that the outrigger 30 is grounded by extending the outrigger, it may be determined whether the outrigger is in the grounding state or the non-grounding state on the basis of the change amount at the time of extension/contraction by extending/contracting or contracting the outrigger as in the second embodiment.

REFERENCE SIGNS LIST

A1, A2 outrigger control device
CC crane
10 traveling body
20 boom
30 outrigger
31 beam
32 jack
100 controller
101 grounding determination processing unit
300 sensor group
301 first outrigger
300 second outrigger
303 third outrigger
304 fourth outrigger
310 inclination sensor

The invention claimed is:

1. An outrigger control device comprising:
a plurality of outriggers that are provided in a traveling body, and are extendable and contractible between a non-grounding state where the traveling body is not supported by the plurality of outriggers and a grounding state where the traveling body is supported by the plurality of outriggers;
an inclination sensor that is provided in the traveling body, and is able to detect an inclination of the traveling body; and
a controller that controls an extension and contraction action of the plurality of outriggers and acquires a detection signal of the inclination sensor, wherein
the controller performs a following process for all of the plurality of outriggers:
extending one of the plurality of outriggers from the non-grounding state, and
determining the extended one of the plurality of outriggers is in the grounding state when a change of a detected value of the inclination sensor at a time of extension exceeds a preset threshold.

2. An outrigger control device comprising:
a plurality of outriggers that are provided in a traveling body, and are extendable and contractible between a non-grounding state where the traveling body is not supported by the plurality of outriggers and a grounding state where the traveling body is supported by the plurality of outriggers;
an inclination sensor that is provided in the traveling body, and is able to detect an inclination of the traveling body; and
a controller that controls an extension and contraction action of the plurality of outriggers and acquires a detection signal of the inclination sensor, wherein
the controller extends the plurality of outriggers until the plurality of outriggers are estimated to be grounded, and then performs a following process for all of the plurality of outriggers:
extending and contracting one of the plurality of outriggers;

determining the extended and contracted one of the plurality of outriggers is in the grounding state when a change of a detected value of the inclination sensor at a time of the extension and contraction exceeds a preset threshold;

determining the extended and contracted one of the plurality of outriggers is in the non-grounding state when the change of the detected value of the inclination sensor at the time of extension and contraction is equal to or less than the preset threshold; and extending the extended and contracted one of the plurality of outriggers until it is in the grounding state.

3. The outrigger control device according to claim 1, wherein a pair of left and right outriggers of the plurality of outriggers are provided in each of front and rear parts of the traveling body, and each outrigger of the plurality of outriggers has a jack that is able to move the traveling body in an upper-lower direction by extension and contraction.

4. The outrigger control device according to claim 2, wherein a pair of left and right outriggers of the plurality of outriggers are provided in each of front and rear parts of the traveling body, and each outrigger of the plurality of outriggers has a jack that is able to move the traveling body in an upper-lower direction by extension and contraction.

\* \* \* \* \*